April 2, 1935.      J. McCLELLAND      1,996,341
SLIP COUPLING
Filed June 11, 1932
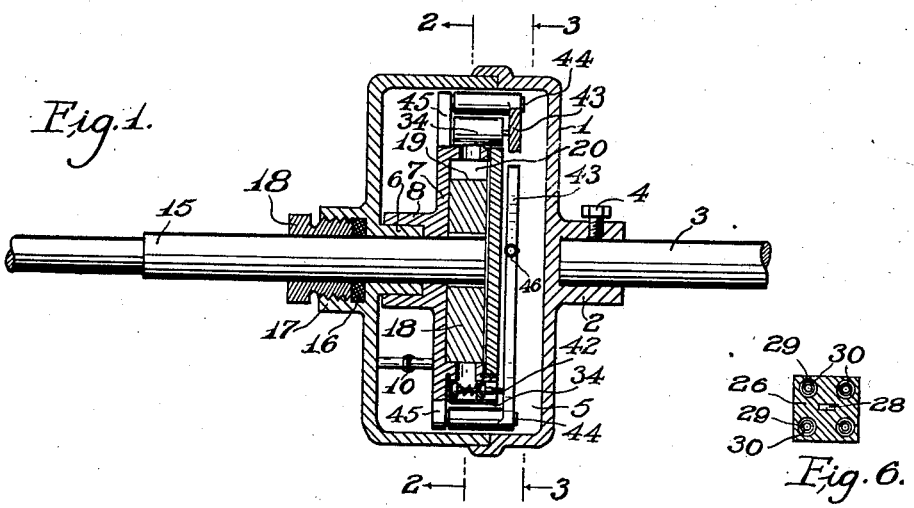
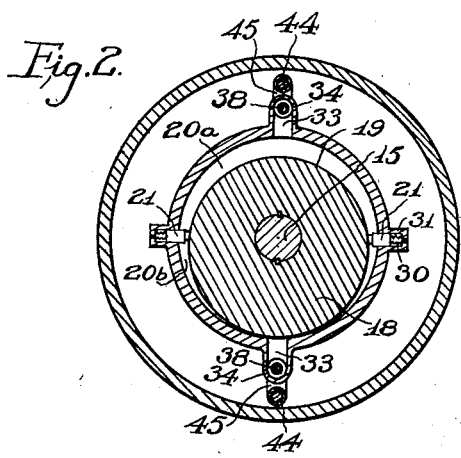
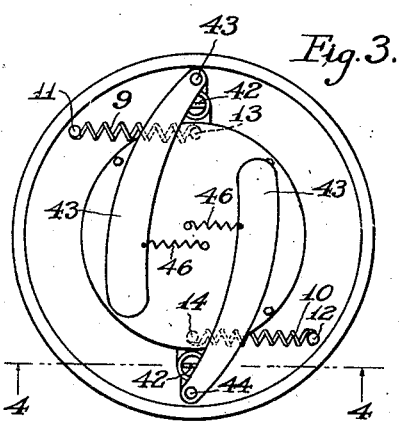
Inventor
JOHN McCLELLAND.

Patented Apr. 2, 1935

1,996,341

UNITED STATES PATENT OFFICE 1,996,341

SLIP COUPLING

John McClelland, Philadelphia, Pa., assignor of one-half to J. Alexander Kline, Philadelphia, Pa.

Application June 11, 1932, Serial No. 616,621

11 Claims. (Cl. 192—58)

My invention is a coupling for communicating power from a variable-speed driving member to a constant speed driven member, and the leading objects of my invention are the provision of such a device through which a driven member can be operated at constant speed without shocks or jars, which is very sensitive to and immediately compensates for changes in the rate of speed of the driving member, and which provides a simple, inexpensive and efficient coupling having few parts and of relatively light weight.

My improved coupling is applicable to a wide variety of uses but is particularly designed for the transmission of power to drive a generator or dynamo at a constant rate so as to provide a current output suitable for direct connection with a radio set for effecting the operation thereof independently of variations in the speed of a prime mover supplying the power and which is ordinarily an internal combustion engine operated at variable speeds for driving a vehicle, vessel or aircraft.

In its preferred form, my invention is embodied in a housing connected with one of the drive mechanisms and forming a reservoir for a fluid. The housing also contains a pump immersed in the fluid and having therein an impeller or piston operable by the other drive mechanism to impart pressure to fluid drawn from the reservoir into the pump case. The pressure applied to the fluid causes the flow thereof through a port or passage controlled by centrifugal governor mechanism carried by the pump case.

The constriction of such port or passage causes the transmission of pressure from the impeller through the fluid to the pump case to cause the rotation thereof, and such movement of the pump case is communicated to the housing through a yielding connection having sufficient elasticity to absorb any shock resulting from changes in the rate of movement and sufficient resiliency to restore the parts to normal running position after they have been displaced as a result of a sudden change in the rate of movement of one of the drive mechanisms.

The characteristic features and advantages of my improvements will further appear from the following descriptions and the accompanying drawing in illustration of a preferred embodiment thereof:

In the drawing, Fig. 1 is an irregular vertical sectional view through a coupling embodying my invention and connected with a driven member and a driving member of a drive apparatus; Fig. 2 is a transverse sectional view on the line 2—2 of Fig. 1; Fig. 3 is a transverse sectional view on the line 3—3 of Fig. 1; Fig. 4 is an enlarged transverse sectional view on the line 4—4 of Fig. 3; Fig. 5 is an enlarged fragmentary view showing details of construction of the vanes contacting with the periphery of the pump rotor and Fig. 6 is a transverse sectional view on the line 6—6 of Fig. 5.

As illustrated in the drawing, the hollow circular housing 1 has a hub 2 through which it is connected with a drive member, such as the driven shaft 3. The hub and shaft may be secured together by a set screw 4 and the shaft 3 may be connected with an electric generator (not shown).

The housing 1 contains a chamber 5 filled with a fluid such as a lubricating liquid and a hub 6, integral with the housing, projects into the chamber 5. A pump body or case 7 has a hollow boss 8 revolubly sleeved on the hub 6 and the pump body 7 is further connected with the housing 1 through springs 9 and 10 anchored to the pins 11 and 12 on the housing 1 and to the pins 13 and 14 on the pump body 7. The springs 9 and 10 normally maintain the pump body in a pre-determined position relative to the housing, but the springs will yield under sufficient stress to permit relative movement of the pump body and housing under the shock or jar of starting or abrupt changes of speed but will restore the parts to their normal position when the stress has ceased and will maintain the parts in normal position against the force requisite to transmit power for maintaining the rotation of the driven member at the desired speed.

A drive member, such as the driving shaft 15 connected with a prime mover, is journalled in the hub 6 and boss 8 and the joint is sealed by a packing 16 in the journal box 17, the packing being pressed by the gland or follower 18 threaded in the box. The shaft 15 has keyed on the end thereof a rotary impeller or piston 18 having a peripheral surface 19 eccentric to the axis of the shaft 15. The rotor 18 is revoluble by the shaft 15 in the chamber 20 of the pump and the periphery thereof is engaged by diametrically disposed brushes or bearing blocks 21. These brushes extend across the width of the chamber 20 and by their contact with the periphery of the rotor effectively divide the chamber 20 into two substantially non-communicating compartments 20a and 20b.

Each bearing block preferably consists of a bronze head 22 having a surface 23 making close bearing contact with the periphery of the rotor 18. The head has a convex bearing surface 24 which rocks in the seat formed by the concave bearing surface 25 of the follower 26, the movement of the head 22 in its seat being limited by the feather 27 housed in the slot 28 of the follower. The follower 26 contains the recesses 29 for the reception of coiling springs 30 which bear against the end of a hollow boss 31 forming a slideway for the follower and which contains a bleed port 32 to prevent the follower from becoming airbound in its retracted position in the hollow boss. The springs 30 exert sufficient pressure on the follower 26 to hold the head 22 in substantially sealing contact with the periphery of the rotor, but the springs are compressed to permit the passage of the high part of the cam surface of the rotor. The compartments 20a and 20b respectively communicate with the chamber 5 through passages 33 each controlled by a valve mechanism in a valve casing 34 provided with conoidal ports 35 and 36.

Each valve mechanism consists of a conoidal valve body 37 complementary to a seat 36 and having fixed thereto a stem 38 on which is sleeved a conoidal valve body 39 complementary to a seat 35. Coiled springs 40 bear against the partitions containing the valve seats 36 and press the valve bodies 39 toward their seats 35.

A follower 41, hinged to each valve casing 34 is rocked against the boss 37' of the valve body 37 to seat the latter as a result of the engagement of a centrifugal governor with the cam face 42 of the follower 41. The centrifugal governor preferably consists of a curved, weighted lever 43 journalled on a stud 44 of the boss 45 projecting from the pump body 7. Each weighted arm 43 is normally drawn inward toward the axis of rotation of the shaft 15 and into position to seat the valve 37 by a coiled spring 46 anchored to the pump body.

In the operation of the devices, starting from a position of rest, the rotation of the shaft 15 turns the rotor 18 in the chamber 20 and the suction thereby created in the compartments 20a and 20b causes the opening of the one-way valves 39 admitting fluid from the chamber 5 into the compartments 20a and 20b. The valve bodies 37 are seated in the seats 36, to prevent the escape of fluid from the compartments 20a and 20b, by the rocking of the followers 41 by the fulcrumed arms 43 which are drawn inward toward the axis of the shaft 15 by the springs 46. The continued rotation of the rotor 18 applies pressure to the fluid in the chamber 20. Since the fluid cannot escape past the seated valves 37 and 39, the force impressed upon the fluid is communicated to the valve body 7 and tends to turn the same upon the hub 6. The springs 9 and 10, while permitting an initial movement of the body 7 on the hub 6 to take up shock, soon prevent further rotary movement of the body 7 and restore it to its original position and its rotary movement is communicated through the springs 9 and 10 to the housing 1 and thence to the driven shaft 3.

If, however, the speed of the rotation of the shaft 15 exceeds that which it is desired to impart to the shaft 3, the centrifugal action on the arms 43 moves them outward from the axis of the shaft 15 against the resistance of the springs 46. This outward movement of the arms 43 permits the rocking of the followers 41 and the unseating of the valve bodies 37 to a greater or less degree, dependent upon the extent of movement of the arms 43. The unseating of the valves 37 permits the escape of fluid from the chamber 20, thereby allowing the rotor 18 to turn relative to the pump body 7. The turning of the rotor 18 will, however, draw in sufficient fluid through the port 35 to replace that discharged through the ports 36, and hence sufficient pressure will be applied through the fluid to cause the rotation of the pump body 7 and its connected parts at the desired rate. Every variation in the speed of the shaft 15 will result in a corresponding movement of the arms 43 and a consequent opening or closing of the valves 37, hence a constant pressure will be maintained on the fluid in the chamber 20 and a constant speed will be communicated to the shaft 3.

Having described my invention I claim—

1. Coupling mechanism comprising drive members, a housing connected with one of said members, a pump within said housing and having a casing movable relative to said housing, means for gradually restricting the movement of said pump casing relative to said housing, a piston in said pump casing and connected with the other of said drive members, and valve mechanism controlling communication between the pump and housing.

2. Coupling mechanism comprising a rotatable member, a housing forming a fluid container connected with said member, a pump having a casing movable relative to said housing, means for gradually retarding the movement of said pump casing relative to said housing, a piston in said pump, a rotatable member connected with said piston, and means, operable by the rotation of said coupling, controlling the flow from said pump.

3. Coupling mechanism comprising a housing forming a reservoir, a pump having a casing journalled in said reservoir, means gradually retarding the movement of said pump casing relative to said housing, a piston in said pump casing, a shaft connected with said piston, and valve mechanism controlling flow between said reservoir and the interior of said pump casing.

4. Coupling mechanism comprising a housing forming a reservoir and having a hub extending into said reservoir, a pump rotatably carried by said hub in said reservoir, spring mechanism gradually retarding the movement of said pump relative to said housing, said pump containing a piston and a valve controlled passage discharging to said reservoir, a shaft journalled in said hub and connected with said piston, and means operable by the rotation of said coupling for controlling said passage.

5. Coupling mechanism comprising a rotatable member, a pump having a casing operatively connected with said rotatable member and containing a piston chamber, a piston having an eccentric periphery rotatable in said chamber, and bearing blocks engaging the periphery of said piston and dividing said chamber into substantially non-communicating compartments, valve mechanism controlling the discharge from said compartments, and means in said casing operable by the rotation of said coupling for actuating said valve mechanism.

6. A coupling comprising a rotatable member, a pump having a casing operatively connected with said rotatable member and containing means providing a piston chamber yieldable relative to said casing, a relatively movable piston having an eccentric periphery rotatable in said chamber, bearing blocks engaging the periphery of said piston and dividing the chamber into substantially non-communicating compartments, said bearing blocks comprising a spring pressed follower and a head rocking relatively to said follower.

7. Coupling mechanism comprising a rotatable member, a pump casing operatively connected with said rotatable member and containing a relatively movable piston chamber portion, a spring connecting said casing and said portion, a piston having an eccentric periphery rotatable in said chamber, bearing blocks engaging the periphery of said piston and dividing said chamber into substantially non-communicating compartments, each of said blocks comprising a head having a curved bearing surface and a follower having a concave face forming a seat for the curved bearing surface of said head, means for limiting the rocking of said head relative to said follower, and a plurality of springs applying pressure to said follower and therethrough to said head.

8. Coupling mechanism comprising a rotatable member; a pump having a casing operatively connected with said rotatable member and containing a piston chamber; a piston in said chamber; and means controlling the discharge from said piston chamber and comprising a valve member, a follower member and a member fulcrumed about an axis parallel to the axis of said rotatable member, said fulcrumed member being rocked on its fulcrum by the rotation of said coupling and one of said members having a cam face through which the rocking of said fulcrumed member operates said valve.

9. Coupling mechanism comprising a rotatable housing forming a reservoir, a pump in said reservoir operatively connected with said housing and containing a piston chamber, a piston in said chamber, and means controlling communication between said piston chamber and said reservoir and comprising a valve casing having axially alined ports therein, interfitting valve bodies movable relative to one another and adapted to close said ports, one of said valves being adapted to be seated and the other of said valves being adapted to be unseated by flow from the piston chamber toward said reservoir, and valve operating means comprising an arm fulcrumed on said pump casing and operable by the rotation thereof.

10. Coupling mechanism comprising a rotatable housing forming a reservoir, a pump within said housing and having a casing operatively connected therewith, said pump casing containing a piston chamber, a piston in said chamber, means controlling communication between said piston chamber and said reservoir and comprising a valve casing containing ports, a valve for closing one of said ports, a spring tending to move said valve toward closing position, a second valve for closing the other of said ports, one of said valves having a stem forming a guide for the other of said valves, and centrifugal mechanism controlling said last named valve.

11. A coupling comprising a rotatable housing forming a reservoir, a pump journalled in said housing, spring mechanism gradually retarding the relative movement of said pump and housing, a piston in said pump, a shaft extending through said housing and connected with said piston, said piston having an eccentric periphery, brushes having rockable heads engaging the periphery of said piston and means controlling communication between said pump and reservoir and comprising arms fulcrumed on said pump, means tending to move said arms towards the axis of rotation of said housing, and valve mechanism controlled by said arms.

JOHN McCLELLAND.